United States Patent [19] [11] 3,947,153
Matthias et al. [45] Mar. 30, 1976

[54] LUBRICATED THRUST BEARINGS FOR PUMP AND MOTOR UNITS

[75] Inventors: Heinz-Bernd Matthias; Christian Klepp, both of Frankenthal; Günter Koll, Frankenthal-Studernheim, all of Germany

[73] Assignee: Klein, Schanzlin & Becker Aktiengesellschaft, Frankenthal, Palatinate, Germany

[22] Filed: July 17, 1974

[21] Appl. No.: 489,421

[30] Foreign Application Priority Data
July 18, 1973 Germany............................ 2336488

[52] U.S. Cl. .............. 417/365; 308/10; 308/134.1; 417/372
[51] Int. Cl.² F04B 17/00; F04B 35/04; F04B 39/02; F16C 39/06
[58] Field of Search.................. 308/10, 134.1, 135; 417/372, 365, 372

[56] References Cited
UNITED STATES PATENTS

| | | | |
|---|---|---|---|
| 2,526,443 | 10/1950 | Woodson........................ | 308/134.1 |
| 2,583,583 | 1/1952 | Mangan.......................... | 417/372 |
| 2,809,590 | 10/1957 | Brown............................ | 417/365 X |
| 2,942,555 | 6/1960 | Pezzillo.......................... | 308/135 X |
| 3,201,182 | 8/1965 | Weissman....................... | 308/10 |
| 3,565,495 | 2/1971 | Lyman........................... | 308/10 |
| 3,731,984 | 5/1973 | Habermann..................... | 308/10 |
| 3,791,704 | 2/1974 | Perper............................ | 308/10 |
| 3,811,740 | 5/1974 | Sacerdoti et al................. | 308/10 |

Primary Examiner—Robert J. Spar
Assistant Examiner—Howard Beltran
Attorney, Agent, or Firm—Michael J. Striker

[57] ABSTRACT

A glandless pump and wet motor unit for circulating water in a boiler has an axially movable shaft which is rotatable in a liquid-filled housing of the motor and carries a disk disposed between electromagnets which are energizable to produce an electromagnetic field serving to maintain the shaft through magnetic bearings in a selected axial position when the electromagnets are energized. At least one mechanical auxiliary thrust bearing is provided in the housing and becomes effective in response to deenergization of the electromagnets. The auxiliary bearing may be a Kingsbury bearing which is spaced apart from the electromagnetic thrust bearing, or the auxiliary bearing may include the disk which cooperates with adjacent surfaces of the electromagnets or with adjacent surfaces of the housing when the shaft is subjected to axial stresses while the electromagnets are deenergized. Each bearing is preferably a double-acting bearing, and the auxiliary bearing or bearings are also surrounded by the liquid which is confined in the housing. The disk of the electromagnetic thrust bearing has one or more radial channels which circulate liquid in the housing when the shaft rotates to drive the impeller of the pump.

10 Claims, 2 Drawing Figures

LUBRICATED THRUST BEARINGS FOR PUMP AND MOTOR UNITS

BACKGROUND OF THE INVENTION

The present invention relates to improvements in pump and motor units, especially in hermetically sealed pump and motor units wherein an electric motor (preferably a wet motor) drives a centrifugal pump for circulation of water or another hydraulic fluid in a boiler or the like. More particularly, the invention relates to improvements in thrust bearing assembles for axially movable, axially stressed motor shafts in pump and motor units.

Boiler circulators in the form of pump and motor units must frequently operate at extremely high system pressures and temperatures. Such units must remain effective during each and every stage of operation including one or more stages during which the temperature and/or pressure of circulated fluid fluctuates within an extremely wide range. Many recent types of boilers employ at least one but normally two pairs of pump and motor units which are connected in parallel. When the boiler is started, one of the units normally operates under overload prior to starting of the other unit or units. At such stage of boiler operation, the operating point of the one unit is well within the overload range so that axial stresses upon the motor shaft which carries the impeller of the pump are extremely high due to suction which develops in the region of the impeller and causes a pronounced rise in axial and radial stresses.

The situation is analogous during normal operation of the boiler, i.e., when the liquid supplying pump begins to feed liquid into the boiler. The one recirculating pump and motor unit is then caused to coast (the operating point then lies in the fourth force quadrant of the flow-head performance curve, i.e., in the negative range) which also results in generation of pronounced stresses upon the bearings for the motor shaft. In order to save energy, the operators prefer to disconnect the motor of the circulating pump and motor unit from the source of electrical energy which results in an operation known as windmilling. The unit then constitutes an additional resistance in the system and its rotary parts can turn at speeds ranging from zero to well beyond the normal operating speed. When the rotational speed is low, the customary hydrodynamic bearings are incapable of resisting the developing axial stresses. Therefore, the construction of thrust bearings in such units is of great importance and the presently known bearings are often incapable of taking up stresses during each and every stage of boiler operation.

SUMMARY OF THE INVENTION

An object of the invention is to provide a novel and improved thrust bearing assembly for use in pump and motor units, especially in pump and motor units which are utilized to circulate water in boilers and wherein a wet motor drives a glandless centrifugal pump whose impeller is attached to the motor shaft.

Another object of the invention is to provide a thrust bearing assembly which can be used as a superior substitute for thrust bearings in presently known pump and motor units and whose mounting necessitates minor changes in the design of existing units.

A further object of the invention is to provide a bearing assembly which embodies at least one safety feature so that it can continue to take up axial stresses even if its main bearing breaks down or is rendered ineffective due to an accident or on purpose.

An additional object of the invention is to provide a thrust bearing assembly which can take up extremely high axial stresses including those occuring as a result of cavitation and stresses which develop due to rotation of the motor shaft at a very low speed, which operates satisfactorily even if the coolant which surrounds the bearing assembly contains solid particles, which occupies little room, and which is constructed and assembled in such a way that at least one group of its components is always held in a position of readiness to take up all or some axial stresses if another group of components breaks down or is rendered ineffective, either accidentally or on purpose.

The invention is embodied in a pump and motor unit, especially in a pump and motor unit wherein a wet electric motor drives a centrifugal pump for circulation of water or another hydraulic fluid whose pressure and/or temperature fluctuates within an extremely wide range. The improved unit comprises a liquid-containing housing, a shaft which is rotatably mounted in the housing and has at least some freedom of axial movement therein, a preferably double-acting main thrust bearing which is in contact with liquid in the housing and includes a disk on the shaft and electromagnet means provided in the housing adjacent to the disk and being energizable to produce an electromagnetic field which normally maintains the disk and the shaft in a predetermined axial position with respect to the housing, and at least one preferably double-acting mechanical auxiliary thrust bearing for the shaft. The parts of the auxiliary bearing are in contact with liquid in the housing.

The electromagnet means defines with the disk at least one clearance and the pump and motor unit may further comprise means for regulating the strength of the electromagnetic field as a function of changes in the width of the clearance in response to variations of axial stresses upon the shaft.

In accordance with a more specific feature of the invention, the one auxiliary bearing may comprise a radially extending surface on the disk and a surface on the electromagnet means. The two surfaces are out of contact with each other in energized condition of the electromagnet means and engage with each other in response to axial stressing of the shaft in deenergized condition of the electromagnet means.

In accordance with another more specific feature of the invention, the auxiliary bearing includes a radially extending first surface on the disk adjacent to the electromagnet means and a second surface provided on the housing adjacent to the first surface and surrounding the electromagnet means (i.e., the distance between the axis of the shaft and the electromagnet means is less than the distance between the axis of the shaft and the second surface). The two surfaces are disengaged from each other in energized condition of the electromagnet means and engage with each other in response to axial stressing of the shaft in deenergized condition of the electromagnet means. The arrangement is preferably such that the distance between the two surfaces is energized condition of the electromagnet means is less than the distance between the first surface and the electromagnet means so that the first surface remains out of contact with the electromagnet means when the latter is deenergized so that the first surface engages the second surface in response to axial stressing of the shaft.

The disk may comprise means for circulating the liquid in the housing; such circulating means may comprise one or more substantially radially extending channels or passages each having an intake end nearer to and a discharge end remote from the axis of the shaft.

In accordance with a further more specific feature of the invention, the auxiliary bearing may constitute a Kingsbury thrust bearing which is spaced apart from the main thrust bearing, as considered in the axial direction of the shaft.

The novel features which are considered as characteristic of the invention are set forth in particular in the appended claims. The improved bearing assembly itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
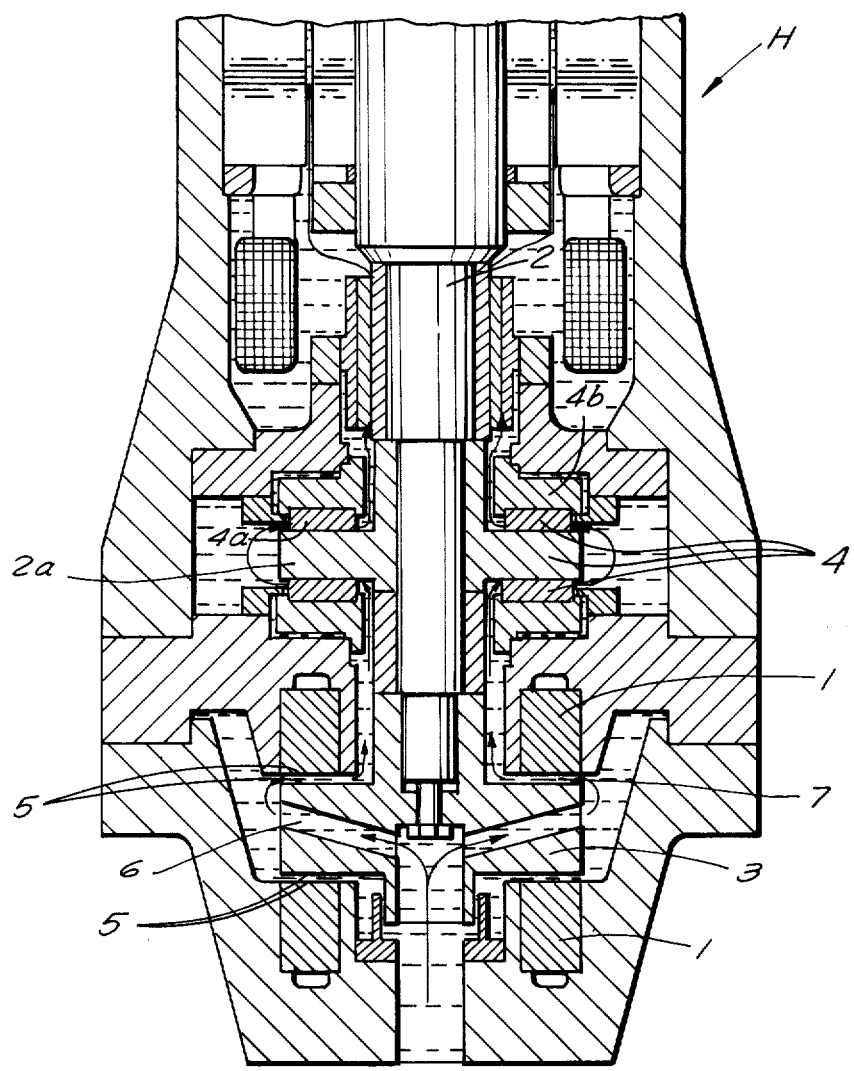
FIG. 1 is a fragmentary axial sectional view of an electric motor which drives a centrifugal pump and whose shaft is mounted in a bearing assembly embodying one form of the invention.

FIG. 1 shows the housing H of an electric motor (e.g., a 3-phase squirrel cage induction type wet motor) which drives the impeller of a centrifugal pump (not shown). The pump and motor unit is used for circulation of a hydraulic fluid in a boiler, and the pump is preferably of the glandless type. The housing H contains electromagnets 1 which cooperate with a disk 3 on the motor shaft 2 to form therewith a main or primary axial or thrust bearing. The electromagnets 1 act on both sides of the disk 3 and their electromagnetic field takes up the axial stresses which are transmitted to the disk 3 and motor shaft 2 by the impeller of the pump in the boiler.

The shaft 2 further rotates in a mechanical thrust bearing 4 which constitutes an auxiliary or emergency axial bearing and becomes effective when the supply of electrical energy to the electromagnets 1 is interrupted. This insures that the unit remains operative even if the primary thrust bearing is out of commission, e.g., until the cause of the interruption of energy supply is detected and eliminated or while the boiler is in the process of being shut down.

It is also within the purview of the invention to omit the auxiliary thrust bearing 4 and to use the assembly of parts 1, 3 as a combined primary and auxiliary thrust bearing. Such function is performed by the neighboring surfaces 5 of the disk 3 and electromagnets 1.

That portion of the housing H which contains the thrust bearings is completely filled with a cooling liquid which also serves to cool the thrust bearings, especially the primary bearing 1, 3. To this end, the disk 3 is formed with at least one but preferably two or more substantially radially extending passages or channels 6 which draw the liquid at their inner ends and discharge the liquid at their outer ends to thus insure an effective cooling of the disk by streams of continuously circulating liquid. The liquid withdraws heat from the primary bearing as well as from the auxiliary bearing 4. Moreover, such circulation insures a more satisfactory lubrication of moving parts including the shaft 2 and the components of the two thrust bearings as well as the evacuation of contaminants (especially solid particles of dirt) from the clearances 7 and/or the clearances between the parts of the auxiliary thrust bearing 4. The flow of liquid in the housing H is indicated by arrows.

The auxiliary bearing 4 is a double-acting Kingsbury type bearing and comprises a chromium-plated chrome-steel disk 2a which is affixed to the shaft 2, ring-shaped pads 4a at both sides of the disk 2a, and ring-shaped shoes 4b in the housing H. The pads 4a are disposed between the shoes 4b and the respective sides of the disk 2a.

The clearances 7 between the electromagnets 1 and the surfaces of the disk 3 are relatively wide so as to insure that the main thrust bearing can take up extremely high stresses without permitting the disk 3 to contact the electromagnets, as long as the latter remain connected to the source of electrical energy. This guarantees that the neighboring surfaces 5 of the parts 1, 3 are normally out of contact with each other and the primary thrust bearing is not subjected to any wear as a result of friction.

The unit preferably further comprises means for monitoring the width of clearances between the disk 3 and electromagnets 1, and for regulating the intensity of electromagnetic fields when the width of such clearances is outside of a preselected range. The width of clearances can be monitored directly (i.e., by continuously measuring the distance between the one or the other side of the disk 3 and the adjacent electromagnet 1) or indirectly by monitoring the axial position of the motor shaft 2 which is rigid with the disk 3. The monitoring means preferably comprises a proximity probe whose output supplies electric signals having an intensity which is proportional to the width of the clearance between one side of the disk 3 and the respective electromagnet 1.

Figure 2:
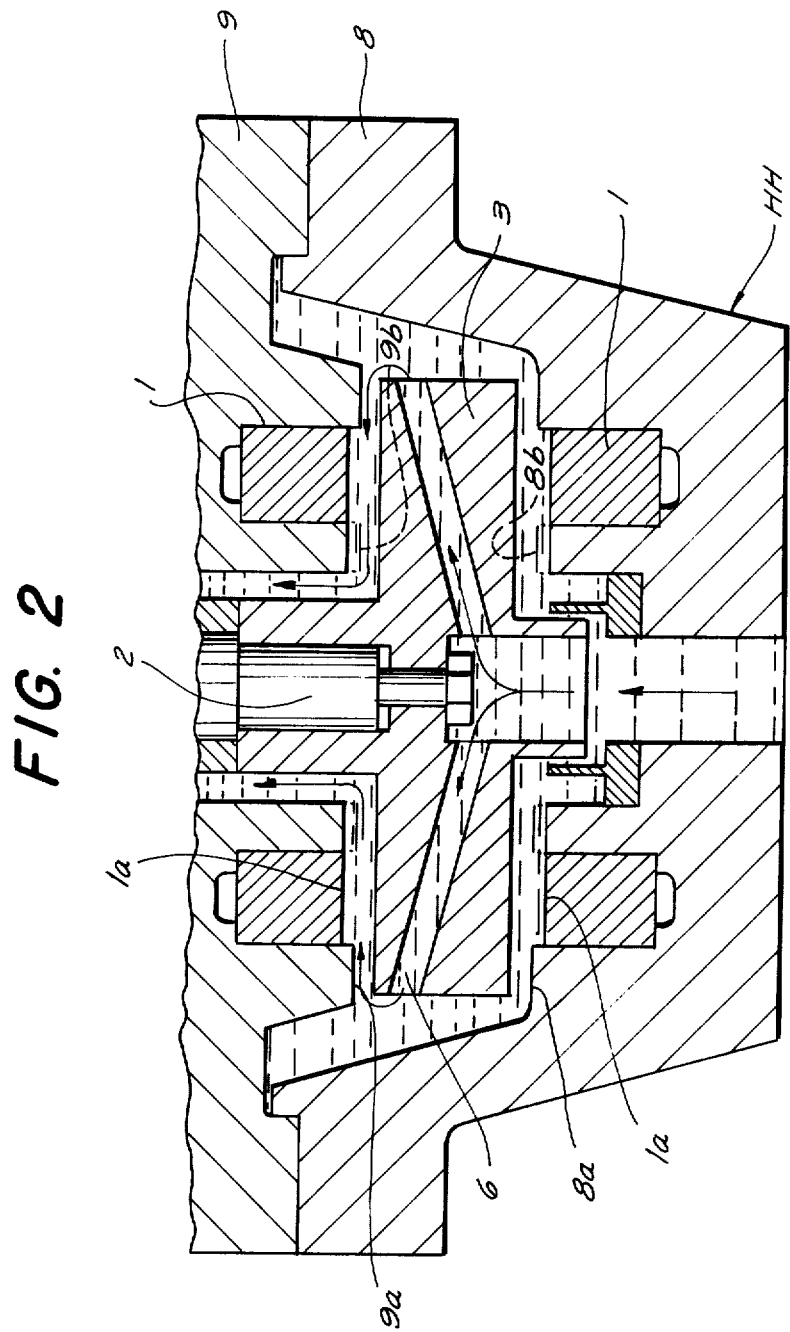
FIG. 2 is a fragmentary axial sectional view of a motor embodying a modified bearing assembly.

If the primary thrust bearing performs the function of an auxiliary or emergency bearing (e.g., due to an interruption in the connection between the electromagnets 1 and the energy source) and the auxiliary bearing 4 is not used, the disk 3 can be permitted to directly engage the adjacent surfaces of the electromagnets 1. Alternatively, the unit can be modified in a manner as shown in FIG. 2. Thus, the housing HH includes two annular sections 8, 9 into which the electromagnets 1 are embedded so that the surfaces 8a, 9a of the sections 8, 9 are nearer to the disk 3 than the surfaces 1a of the electromagnets. When the primary thrust bearing is used as an emergency bearing, the disk 3 engages the surface 8a or 9a but remains spaced apart from the surfaces 1a to thus avoid the wear upon the electromagnets. It will be noted that the surfaces 8a, 9a surrounds the electromagnets 1, i.e., that the loci of mechanical contact between the disk 3 and housing section 8 or 9 are more distant from the axis of shaft 2 than the electromagnets 1. However, it is also within the purview of the invention to provide the sections 8, 9 with annular surfaces (indicated at 8b, 9b) which are nearer to the axis of the shaft 2 than the electromagnets 1 or to provide the section 8 and/or 9 with two surfaces (8a, 8b and/or 9a, 9b) which can engage the disk 3 when the primary thrust bearing is out of commission. The flow of liquid in the housing HH is indicated by arrows.

It is clear that the improved thrust bearing arrangement can be used with equal advantage in all such establishments wherein the impeller of a pump is subjected to substantial axial stresses which are normally taken up by a primary thrust bearing and wherein at least one auxiliary thrust bearing is needed or desirable to take up axial stresses when the primary bearing is disconnected or out of commission. For example, the bearing arrangement can be used to circulate a liquid in a boiling water reactor.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. In a pump and motor unit, especially in a unit wherein a wet electric motor drives the impeller of a centrifugal pump for circulation of hydraulic fluids at least one of several characteristics of which fluctuates within a wide range, said characteristics including the temperature and pressure of fluids, a combination comprising a liquid-containing housing; a shaft rotatably mounted in said housing; a main thrust bearing in contact with the liquid in said housing and including a disk on said shaft and electromagnet means provided in said housing adjacent to said disk and being energizable to produce an electromagnetic field which normally maintains said disk and said shaft in a predetermined axial position with respect to said housing; and at least one mechanical auxiliary thrust bearing for said shaft, said auxiliary thrust bearing being in contact with the liquid in said housing.

2. A combination as defined in claim 1, wherein said electromagnet means defines with said disk at least one clearance, and further comprising means for regulating the strength of said field in dependency on changes in the width of said clearance in response to variations in axial stresses upon said shaft.

3. A combination as defined in claim 1, wherein said one auxiliary bearing comprises a radially extending surface on said disk and a surface on said electromagnet means, said surfaces being out of contact with each other in energized condition of said electromagnet means and engaging with each other in response to axial stressing of said shaft in deenergized condition of said electromagnet means.

4. A combination as defined in claim 1, wherein said auxiliary bearing includes a radially extending first surface provided on said disk, adjacent to said electromagnet means and a second surface provided on said housing adjacent to said first surface and surrounding said electromagnet means, said surfaces being disengaged from each other in the energized condition of said electromagnet means and engaging with each other in response to deenergization of said electromagnet means.

5. A combination as defined in claim 4, wherein the distance between said surfaces in energized condition of said electromagnet means is less than the distance between said first surface and said electromagnet means so that said electromagnet means is out of contact with said first surface when the latter engages said second surface.

6. A combination as defined in claim 1, wherein said disk comprises means for circulating the liquid in said housing.

7. A combination as defined in claim 6, wherein said circulating means comprises at least one substantially radially extending channel having an intake end nearer to and a discharge end remote from the axis to said shaft.

8. A combination as defined in claim 1, wherein said auxiliary bearing is a Kingsbury thrust bearing.

9. A combination as defined in claim 1, wherein said auxiliary bearing is spaced apart from said main bearing, as considered in the axial direction of said shaft.

10. A combination as defined in claim 1, wherein each of said bearings is a double-acting bearing.

* * * * *